United States Patent [19]

Bradley et al.

[11] 4,041,254

[45] Aug. 9, 1977

[54] TELEPHONE LINE CHARACTERISTIC DISPLAY

[75] Inventors: Frank R. Bradley, Bronx; Rawley D. McCoy, Bronxville, both of N.Y.

[73] Assignee: Bradley Telcom Corporation, Leonia, N.J.

[21] Appl. No.: 717,350

[22] Filed: Aug. 24, 1976

[51] Int. Cl.² .............................................. H04B 3/46
[52] U.S. Cl. .......................... 179/175.3 R; 324/121 R
[58] Field of Search .................. 179/175.3 R, 175; 328/162; 324/121 R, 57 N, 57 DE, 79 R, 95, 82

[56] References Cited

U.S. PATENT DOCUMENTS

| 3,814,868 | 6/1974 | Bradley | 179/175.3 R |
| 3,906,173 | 9/1975 | Bradley | 179/175.3 R |
| 3,927,281 | 12/1975 | Bradley | 179/175.3 R |
| 3,985,980 | 10/1976 | Bradley | 179/175.3 R |

*Primary Examiner*—Douglas W. Olms
*Attorney, Agent, or Firm*—Gottlieb, Rackman & Reisman

[57] ABSTRACT

There is disclosed a telephone line characteristic measuring instrument of the type described in U.S. Pat. No. 3,814,868, provided with an oscilloscope display. A signal representing the impairments induced on a test tone by a tele-communication transmission facility, without the test tone itself, is applied to the vertical deflection plates of an oscilloscope. The test tone, or one of its harmonics, is applied to the horizontal deflection plates. The resulting Lissajous patterns identify the source of a disturbance (e.g., amplitude modulation, phase modulation, white noise, etc.).

8 Claims, 27 Drawing Figures

TELEPHONE LINE CHARACTERISTIC DISPLAY

This invention relates to telephone line characteristic measuring instruments and displays, and more particularly to a display which facilitates the identification of sources of data transmission errors.

In U.S. Pat. No. 3,814,868 of Frank R. Bradley, entitled "Telephone line Characteristic Measuring Instrument" which issued on June 4, 1974, and which is hereby incorporated by reference, there is disclosed an improved apparatus for facilitating the identification of sources of data transmission errors. As described in detail therein, a test tone is transmitted and at the end of the transmission path the signal is normalized so that its test tone component is at a reference value level. The test tone is removed from the uncorrelated background noise and other disturbances, and the disturbances are operated upon directly. By first subtracting a replica of the test tone from the normalized received signal, only the periodic and noise components which are of diagnostic interest remain to be processed.

The test tone signal which is transmitted over the communication channel is a single frequency signal of the form Acos (wt). The received signal V, in the absence of non-linear distortion products, can be expressed as follows:

$$, V = AG(w)[1 + m(t)]\cos(wt + \theta(t)) + (t).$$

In this equation, $G(w)$ is the channel amplitude characteristic at the frequency of the test tone and is a measure of the loss of the channel at the test frequency, $m(t)$ is the incidental amplitude modulation, $\theta(t)$ is the incidental phase modulation and includes all of the AC components which cause phase modulation and $n(t)$ is the total uncorrelated interference (noise). The received signal is normalized and the test tone is "notched out" from it. The resulting "notched-noise" signal includes coherent components (amplitude and phase modulation, and amplitude and phase hits) as well as non-coherent components (background noise, single frequency interference, and impulse hits). In the Bradley system, the notched noise signal is multiplied by cos (wt) and sin (wt) signals to generate instantaneous in-phase and quadrature components signals. These two signals are then filtered and processed so as to provide measurements of the in-phase and quadrature components of the disturbances.

In Bradley U.S. Pat. No. 3,906,173, entitled "Telephone Line Characteristic Measuring Instrument and Display" which issued on Sept. 16, 1975, which patent is hereby incorporated by reference, there is disclosed a system in which the in-phase and quadrature components of the total disturbance on the received test tone are applied to orthogonal deflection plates of an oscilloscope. The resulting display allows the major source of a disturbance to be readily identified. It is a general object of the present invention to provide a different type of display, a display which can be implemented at reduced cost and which may be preferred by some users.

Briefly, in accordance with the principles of our present invention, the in-phase and quadrature components of the disturbance are not applied to orthogonal deflection plates of an oscilloscope. In fact, it is not even necessary to derive them. It is the notched noise signal, without any subsequent processing, that is applied to one of the deflection plate circuits (typically, the vertical plates). The signal applied to the other deflection plate circuit is a reference whose frequency is identical to that of the test tone or one of its harmonics. This signal is already available in the Bradley system disclosed in U.S. Pat. No. 3,814,868, the signal being the output of the loal oscillator of the phase lock loop. The resulting Lissajous pattern on the oscilloscope facilitates a rapid determination of transmission path performance. The phase of the signal applied to the horizontal deflection plates necessarily affects in Lissajous pattern and thus its interpretation. But for any given phase of the horizontal deflection signal relative to the test tone, the Lissajous pattern for a given tone impairment is usually one of several clearly distinguishable forms depending upon the main source of the disturbance.

Further objects, features and advantages of our invention will become apparent upon consideration of the following detailed description in conjunction with the drawing, in which:

FIGS. 9A through 13 depict other illustrative input signals (one of which is that derived by the circuit of FIG. 8) and the respective resulting displays;

Figure 1:
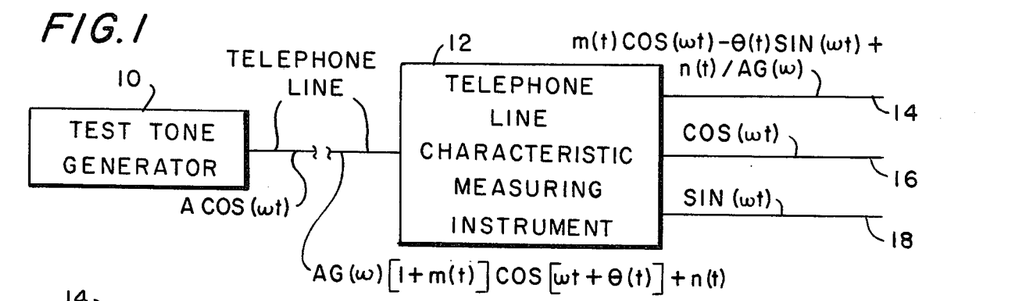
FIG. 1 is a block diagram representation of the manner in which test measurements are made in accordance with the teachings of Bradley U.S. Pat. No. 3,814,868 and shows three resultant signals which are derived.

As shown in FIG. 1, a test tone generator 10 applies a test tone of the form Acos (wt) to a telephone line. The received signal is of the form $AG(w)[1+(m)t)]\cos(wt+\theta(t))+n(t)$, in which $G(w)$ is the channel amplitude characteristic at the frequency of the test tone and is the measure of the loss of the channel at the test frequency $m(t)$ is the incidental amplitude modulation, $\theta(t)$ is the incidental phase modulation, and $n(t)$ is the total uncorrelated interference ("noise").

The received signal is applied to the input of telephone line characteristic measuring instrument 12. This instrument may be of the type disclosed in Bradley U.S. Pat. No. 3,814,868. The instrument functions to remove the test tone component from the overall received signal so that only the test signal disturbances remain. The disturbance signal, on conductor 14 of FIG. 1, is as shown in the drawing — $m(t) \cos(wt) - \theta(wt) + n(t)/AG(w)$. This signal, in FIG. 1 of Bradley U.S. Pat. No 3,814,868, is the V₄ signal at the output of difference amplifier 46.) The test instrument also derives a signal cos (wt) on conductor 16 which is in phase with the received test tone, and a quadrature signal sin (wt) on conductor 18. (The cosine and sine signals are shown on respective conductors 38 and 40 in Bradley U.S. Pat. No. 3,814,868.) It is the signal on conductor 14, and one or both of the signals on conductors 16 and 18, which are used in accordance with the present invention to form a display.

Before proceeding with a description of the various Lissajous pattern which are formed in accordance with the present invention, it should be noted that not all of the elements disclosed in Bradley U.S. Pat. No. 3,814,868 are actually required for the implementation of the present invention. Reference to the Bradley patent reveals the use of two multipliers 52 and 58 for deriving in-phase and quadrature components of the overall disturbance. Multiplier 58, in addition to deriving the in-phase component for display purposes, is also used in the elimination of the test tone component from the overall received signal. Thus although the in-phase disturbance component itself is not required for the display, the multiplier, in accordance with the preferred embodiment of the present invention, is required to derive the disturbance signal on conductor 14. Multiplier 52, however, whose only function is to derive the quadrature component of the disturbance signal, is not necessary in accordance with the present invention; unlike the systems disclosed in both of the aforesaid Bradley patents, the in-phase and quadrature components of the disturbance signal are not required for the display. Instead, it is the overall disturbance signal which is operated upon as an entity, along with a replica of the test tone, the test tone shifted by 90°, or an harmonic of the test tone. The alternative forms of display contemplated by the present invention have been found to be preferred by some users, especially in that phase disturbances can be more readily distinguished from amplitude disturbances in the presence of noise.

Figure 2:
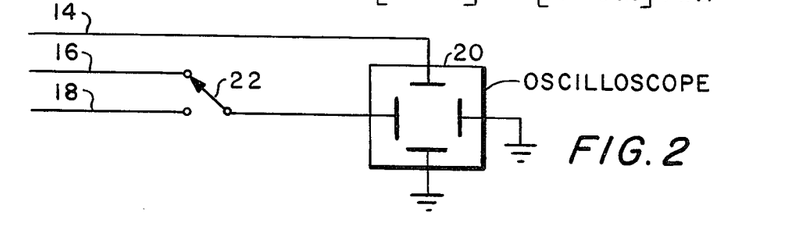
FIG. 2 depicts an illustrative embodiment of the present invention, in which the signals derived in the system of FIG. 1 are applied to the orthogonal inputs of a display such as an oscilloscope.

As shown in FIG. 2, the disturbance signal on conductor 14 is applied to the vertical deflection plates of an oscilloscope. Depending on the position of switch 22, the horizontal deflection plates of the oscilloscope are connected to either the cos (wt) signal on conductor 16 or the sin (wt) signal on conductor 18. Switch 22 is not necessary, and for any given instrument only one of the two tone signals may be applied to the horizontal deflection plates in all cases. The frequency of the signal applied to the horizontal deflection plates is that of the transmitted test tone, typically in the order of 1 kHz. It is to be understood that although the signals are shown coupled directly to the plates of oscilloscope 20 in FIG. 2, in actual practice the signals are extended through respective amplifiers as is known in the art, and in this regard the drawing of FIG. 2 is symbolic only. It should also be understood that although in FIG. 2 the disturbance signal is applied to the vertical plates and the replica of the test tone is applied to the horizontal plates, the two connections may be reversed. The important thing is that the two different signals be applied to orthogonal inputs of a display.

The simplest case to consider is that in which there is no disturbance signal. In such a case, there is no signal on conductor 14 and the electron beam is simply swept back and forth across the face of the oscilloscope screen at the rate of the test tone. The appearance of a stationary horizontal line represents the absence of any disturbance.

Figure 3A:
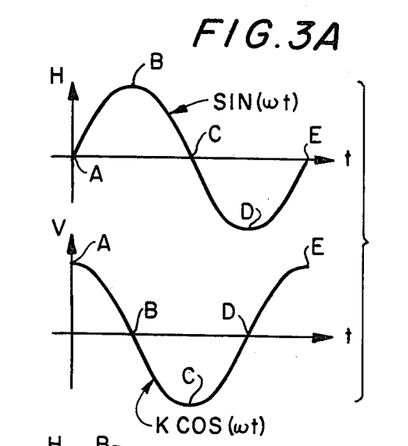
FIG. 3A depicts two illustrative signals applied to the orthogonal inputs of an oscilloscope in accordance with the principles of the invention.
Figure 3B:
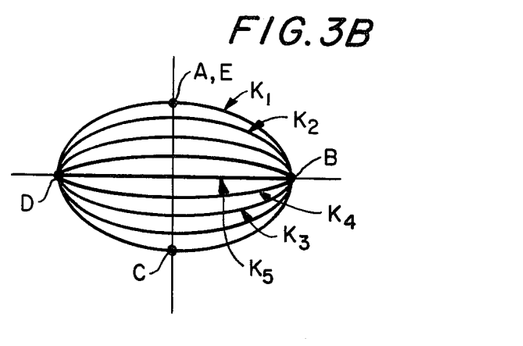
FIG. 3B depicts the resulting display.

FIGS. 3A and 3B illustrate the form of the display when the only disturbance results from amplitude modulation, i.e., $\theta(t)$ and $n(t)$ are both zero. In such a case, the signal applied to the vertical plates is of the form $m(t)\cos(wt)$. It must be understood that $m(t)$ is a continuously varing low-frequency signal. In order to understand the nature of the display which is formed, it will first be helpful to analyze the display for the hypothetical case in which $m(t)$ is equal to a constant $K$. The bottom waveform in FIG. 3A represents a signal Kcos (wt) applied to the vertical deflection plates. The upper waveform in FIG. 3A represents a signal of the form sin (wt) applied to the horizontal deflection plates, i.e., with switch 22 being connected to conductor 18 in FIG. 2. Five points in each waveform are lbled A–E, the same-lettered points in the two waveforms occurring at the same time. By plotting the horizontal and vertical deflections for each of these five points, an elliptical pattern may be traced out as shown in FIG. 3B. The electron beam rotates in the clockwise direction of FIG. 3B at the rate of the two signals. The outer ellipse in FIG. 3B (on which the points A–E are shown) is labeled $K_1$, i.e., the value of $K$ in the lower waveform of FIG. 3A is assumed to be $K_1$. If $K$ assumes some other value, the minor axis of the ellipse changes. Three additional ellipses $K_2$, $K_3$ and $K_4$ are shown in FIG. 3. In the limiting case where $K=K_5=0$, there is no disturbance signal, and the ellipse flattens out into a horizontal line.

From FIG. 3B, it is apparent that if the only kind of disturbance is amplitude modulation and if the signal applied to the horizontal deflection plates is of the form sin (wt), then what is seen is an ellipse. But it must be borne in mind that each of the ellipses shown in FIG. 3B is for a vertical deflection signal of the form Kco (wt) where K is constant. In actual practice, the signal applied to the vertical deflection plates is of the form $m(t)\cos(wt)$, in which $m(t)$ is constantly varying. Typically, $m(t)$ is a low-frequency signal, e.g., a 60-Hz signal, whereas the test tone has a frequency which is at least half an order of magnitude greater. This means that for each trace of the electron beam in an elliptical pattern, the value of $m(t)$ during the trace is relatively constant. It is for this reason that well-defined ellipses are traced out on the display. However, even a 60-Hz signal is very fast as far as the human eye is concerned, and consequently what is seen on the display is somewhat of a blur as successive ellipses widen and narrow in the vertical dimension, at a 60-Hz rate. Depending upon the persistence of the screen (typically, several milliseconds) and the relative frequencies of the test tone and the modulation, the display may exhibit several well-defined ellipses contained within each other, or it may be a single more or less uniform density solid ellipse or it may be a combination of the two. The important thing is that the general outline of the display is an ellipse; if the horizontal signal is sin (wt), then an elliptical display is an indication that the disturbance results from amplitude modulation of the test tone. The larger the vertical axis, the greater the detree of amplitude modulation.

Figure 4A:
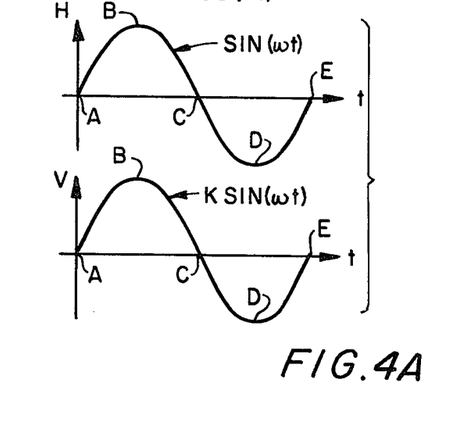
FIG. 4A depicts two other illustrative signals applied to the orthogonal inputs of an oscilloscope.
Figure 4B:
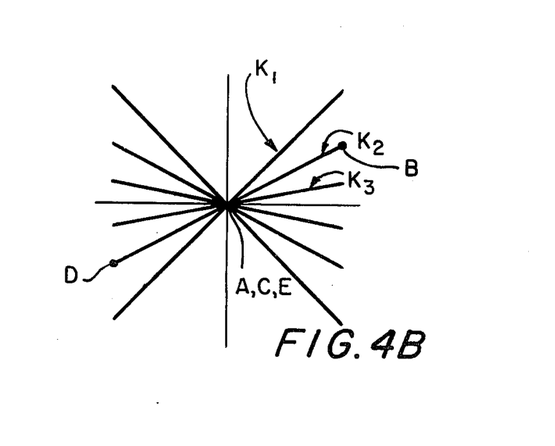
FIG. 4B depicts the resulting display.

FIGS. 4A and 4B depict a situation in which the horizontal signal is the same as that in the case of FIGS 3A and 3B, but the vertical signal is of the form Ksin (wt), rather than Kcos (wt). This is the situation which arises when, in the overall signal on conductor 14, $m(c)$ and $n(t)$ are zero, and $\theta(t)$ is non-zero, i.e., there is a phase disturbance in the received signal. By selecting five points A-E on the two waveforms, corresponding to five instants of time, the resulting Lissajous pattern may be derived. Referring to FIG. 4B, with $K=K_2$, it is easily shown that the trace begins at the origin, moves up in a straight line to point B, moves back toward the origin at point C. continues downward to point D, and then goes back to the origin at point E. Depending on the value of $K$, the slope of the resulting straight line on the trace varies, two additional straight lines corresponding to values for $K$ of $K_1$ and $K_3$ being shown in FIG. 4B. For negative values of K, the two halves of the display are in the second and fourth quadrants, rather than in the first and third, as shown.

While the patterns of FIG. 4B are for values of K which are constant, in actual practice the signal on the vertical plate is of the form $\theta(t)\sin(wt)$, that is, $\theta(t)$ is not a constant but varies as function of time. The resulting display, instead of being a straight line, is a series of straight lines which oscillate back and forth between minimum and maximum limits, in all four quadrants. When $\delta(t)$ is zero (corresponding to an absence of a disturbance on an instantaneous basis), the trace consists of a horizontal line. For non-zero values of $\theta(t)$, the trace is a straight line of varying slope. Depending upon the rate at which $\theta(t)$ changes, either well-defined straight lines are observed, or wedge-shaped blurs emanating from the origin are observed. In either case, if the horizontal deflection signal is of the form $\sin(wt)$, a wedge-shaped display is an indication of the presence of phase-related disturbances.

It should be noted that in both FIGS. 3A and 4A it is the $\sin(wt)$ signal that is applied to the horizontal deflection plates. In the case of FIG 3A, the disturbance signal on the vertical plates is 90° out of phase with the horizontal signal, whereas in the case of FIG. 4A the two signals are in phase with each other. If switch 22 in FIG. 1 is connected to conductor 18 and the $\cos(wt)$ signal is applied to the horizontal deflection plates, then it is the $K\cos(wt)$ signal of FIG. 3A on the vertical plates which is in phase with the horizontal signal, and the $K\sin(wt)$ vertical signal of FIG. 4A that is 90° out of phase with the horizontal signal. In such a case, it is an amplitude modulation disturbance that results in straight-line traces (FIG. 4B) and phase related disturbances which result in elliptical traces (FIG. 3B). The interpretation of the display is thus dependent upon which of the two signals is applied to the horizontal deflection plates. In actual practice, a given instrument may have only one of the two signals permanently coupled to the horizontal deflection circuit to simplify the interpretation of the display, i.e., so that there is no need for the user to interpret an elliptical display or a straight-line display depending upon the horizontal deflection signal; each of the two forms of display would in all cases be associated with one of two types of disturbance.

In the illustrative embodiment of the invention, the vertical axis of the display represents the impairments on the test tone (without the test tone), while the horizontal axis represents a reference signal whicch is synchronous with the test tone. Obviously, the axes can be switched; the two types of display would still be readily distinguished from each other. In all cases, in order for a well-defined Lissajous pattern to be traced out on the display, the signal applied to the reference (horizontal) axis should be phase-locked to the received test one. If it is not, phase and amplitude disturbances cannot be distinguished; the same disturbance may produce either of the displays o FIGS. 3B and 4B, and actually both of them alternately if the phase of the reference signal changes. The $\cos(wt)$ and $\sin(wt)$ signals are readily available in the instrument disclosed in Bradley U.S. Pat. No. 3,814,868 inasmuch as these two signals are generated in a phase lock loop used in connection with removing the test tone from the overall received signal in the first place. It should also be noted that the received signal itself can be used as the reference on the horizontal axis because the dominant part of the signal is the test tone. However, because of the impairments in the overall received signal (which impairments are being measured in the first place ), using the received signal itself on the reference axis results in less sharply-defined Lissajous patterns.

Figure 5A:
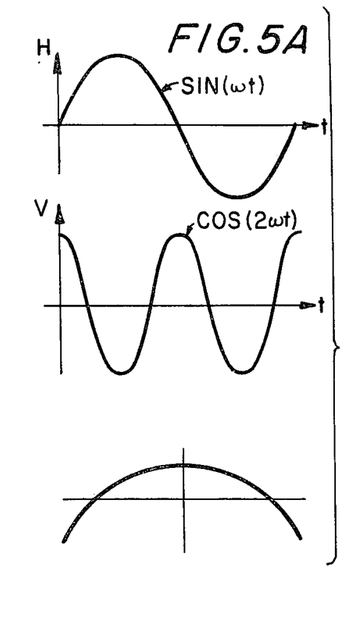
FIGS. 5A, 5B and 5C depicts both two other illustrative input signals along with the respective resulting display.
Figure 5B:
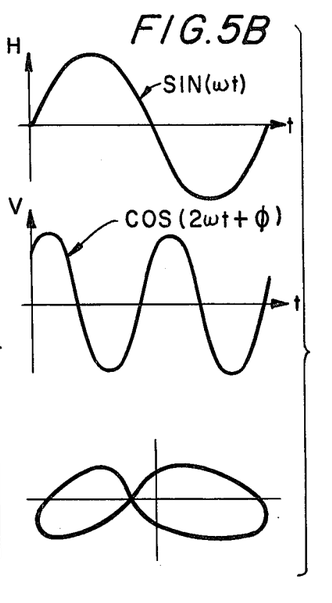
Figure 5C:
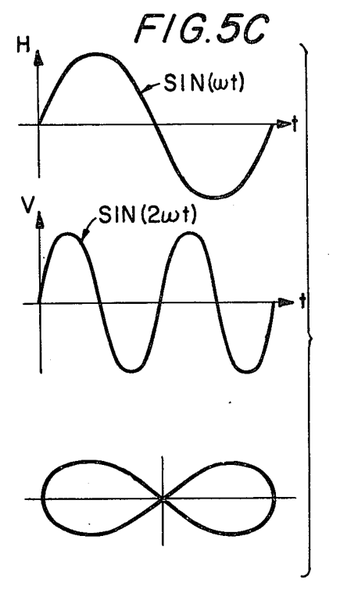

One of the advantages of our instrument is in the observation of "harmonic" patterns. Because the test tone is applied to one axis and the test tone is removed from the overall signal applied to the other axis, in the presence of large-magnitude harmonics the resulting displays are readily recognizable, especially in the cases of second and third harmonics. FIGS. 5A, 5B and 5C illustrate several possible displays which result in the presence of a second harmonic of appreciable amplitude. Each figure includes at the top the waveform applied to the horizontal axis — $\sin(wt)$ — and beneath it a waveform applied to the vertical axis. In each case, the vertical signal has a frequency which is twice that of the test tone; the three cases depicted in the drawing are for different phase relationships between the horizontal and vertical signals. In each figure, the lower drawing represents the Lissajous pattern formed on the display.

With a second harmonic which is 90° out of phase with the test tone (FIG. 5A), the resulting display is a cup-shaped open line, the electron beam sweeping back and forth between the two ends of the line. Depending upon whether the second harmonic leads or lags the test tone, the cup-shaped curve faces downwardly (as shown) or upwardly. If the second harmonic is in phase with the test tone (FIG. 5C), that is, the signal applied to the vertical axis is the same as that in FIG. 5A but shifted in phase by 90°, the resulting Lissajous pattern has two symmetrical lobes. With an arbitrary phase difference between the test tone and the second harmonic (FIG. 5B), which phase difference depends upon the different phase shifts along the channel for the test tone and its harmonic, the resulting display has two lobes, but the pattern is not symmetrical. All three types of display are readily discernable and interpretable as second harmonic distortion.

In actual practice, none of the three stationary displays may actually result due to time-varying phase intercept distortion, such as frequency translation along the channel. The traces at the bottoms of FIGS. 5A-5C assume that one signal is at exactly twice the frequency of the other. But in a typical transmission system this may not be the case. A typical signal which is transmitted from one site to another is often shifted up in frequency and then down again, during the multiplexing and de-multiplexing operations. The two frequency shifts are not always identical and may differ by several Hz. Consider, for example, an initial test tone at a frequency of 1000 Hz. Its second harmonic is 2000 Hz. If the net frequency translation along the channel is 1 Hz, the received test tone will be at 1001 Hz and the received second harmonic will be at 2001 Hz. This means that the relative phases of the two oscilloscope plate signals gradually drift at a 1 Hz rate. Instead of seeing a stationary pattern such as one of those of FIGS. 5A, 5B or 5C, the pattern constantly changes between upwardly directed cups, downwardly directed cups, and two-lobe serpentine figures. But the two-lobe changing patterns stand out and are a clear indication of the presence of second harmonic distortion and frequency translation.

Figure 6A:
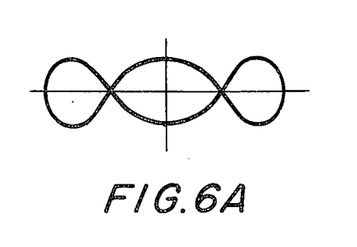
FIGS. 6A, 6B, 7A and 7B depict still further displays which may be formed depending on the major component of the disturbance.
Figure 6B:
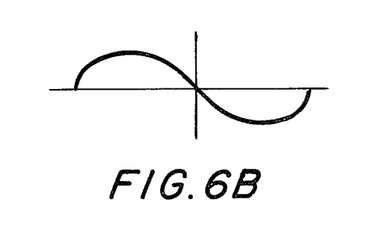

In a similar manner, FIGS. 6A and 6B depict the type of displays which are formed in the presence of third harmonic distortion. Once again, the patterns may change gradually as a result of time-varying phase intercept distortion along the transmission path. But the presence of a three-lobe pattern is a clear indication of third harmonic distortion.

Figure 7A:
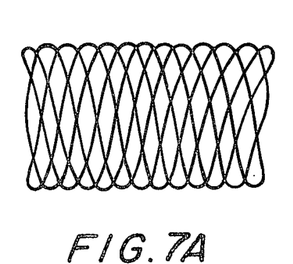

FIG. 7A depicts the form of the display in the presence of single frequency interference. In the usual case, the frequency of the disturbance is not harmonically related to the test tone and thus the display constantly changes. If the frequencies of the interference and the test tone are integrally related, the oscilloscope traces out a stationary lace pattern as shown in FIG. 7A. If the frequencies are not integrally related, the lace pattern constantly changes. Even if the display is blurry, enchanced lines can be seen. This is especially true if the two frequencies are close to each other.

Figure 7B:
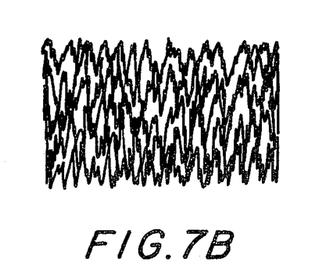

On the other hand, in the presence of noise, the display is not nearly as well-ordered. Because noise is realy a combination of many different frequencies over a broad spectrum, the display is much more blurry, as shown in FIG. 7B.

In the case of two kinds of disturbance, the resulting display is a combination of those previously considered. For example, in the case of second or third harmonic distortion together with noise, two-lobe or three-lobe patterns will be discernible but they will be blurry. Nevertheless, they are relatively simple to perceive. But if noise is present together with amplitude distortion or phase distortion, it is more difficult to distinguish the displays. Referring to FIG. 3B, it will be appreciated that if noise is superimposed on the vertical axis, the generally elliptical display with well-defined lines degenerates to a blur which fills the screen except at the four corners. Referring to FIG. 4B (and recalling that although all of the individual line traces are shown with a positive slope, as the signal on the vertical axis changes phase the line traces assume negative slopes), if noise is superimposed on all of the positive-slope and negative-slope lines, it is apparent that the display will for the most part be a big blur, except at the four corners. Consequently, in the presence of noise, especially of considerable magnitude, it may not only be difficult to perceive the presence of amplitude or phase distortion, but it may not be possible to decide which of these two types of distortion is present as opposed to the other.

We have found that the display may be interpreted more readily by applying to the horizontal axis a signal whose frequency is not that of the test tone, but rather an harmonic of it. The reference signal may be a sine wave, a sawtooth, a triangular wave, or some other waveshape. While each of these waveshapes results in a different series of displays, they are generally more recognizable in the presence of noise or multiple disturbances than the series of displays which results when the reference frequency is the same as that of the test tone. In all cases, however, the reference signal should be phase locked to the received test one, and preferably should have a frequency which is 2 or 3 times that of the received test tone.

Figure 8:
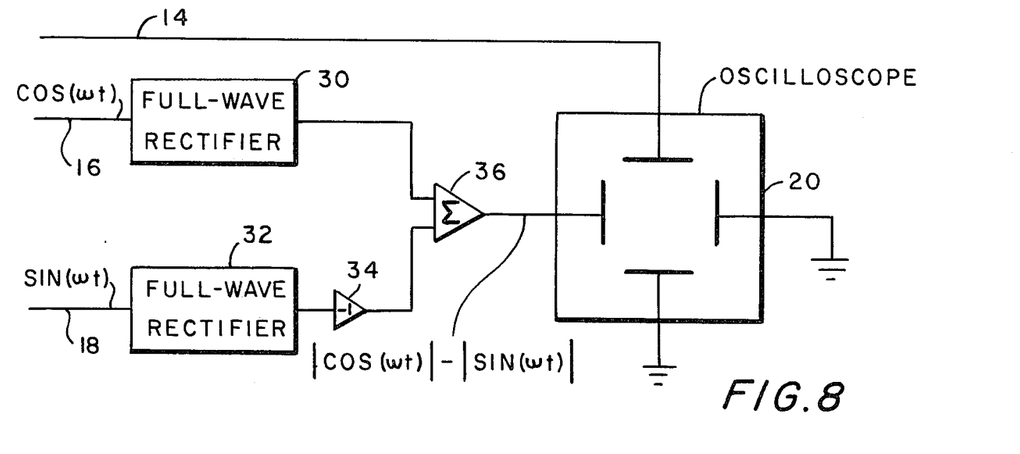
FIG. 8 depicts a circuit for modifying the signal applied to the horizontal deflection circuit so that its frequency is twice that of the test tone, to produce a different set of displays.

The circuit of FIG. 8 derives a triangular waveform which is phase-locked to the test tone and whose frequency is twice as great. It is this signal which is shown coupled to the horizontal deflection plates, with the notched-noise signal on conductor 14 applied to the vertical deflection plates. The circuit derives a triangular waveform at the output of summer 36 for application to the horizontal plates from the cosine and sine signals appearing on conductors 16 and 18 of FIG. 1. Each of the signals is applied to the input of an operational amplifier full-wave rectifier 30 or 32. The output of rectifier 30 is applied to one input of summer 36, and the output of rectifier 32 is applied to the other input of the summer after first being inverted by inverter 34. The output of summer 36 is thus the absolute magnitude of the cosine signal minus the absolute magnitude of the sine signal. This is a good approximation to a triangular waveform. Although it is not exact and the two sloping lines of each cycle are not perfectly straight, it is not important that the triangular waveform be exact since the end points or peak excursions only are a measure of the impairment.

Figure 9A:
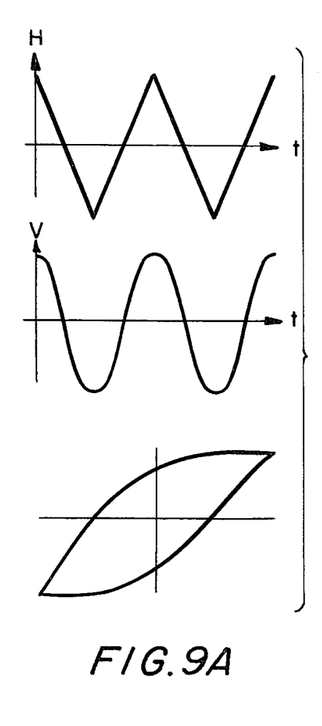
Figure 9B:
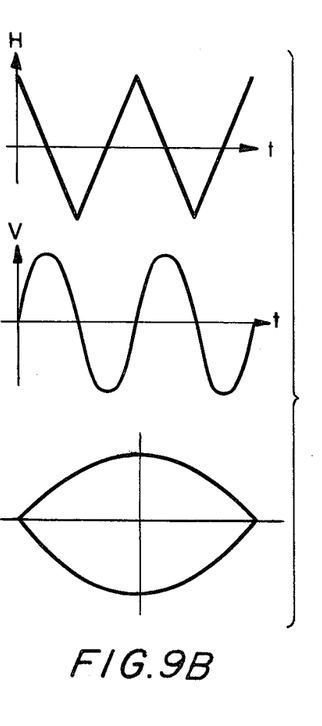
Figure 9C:
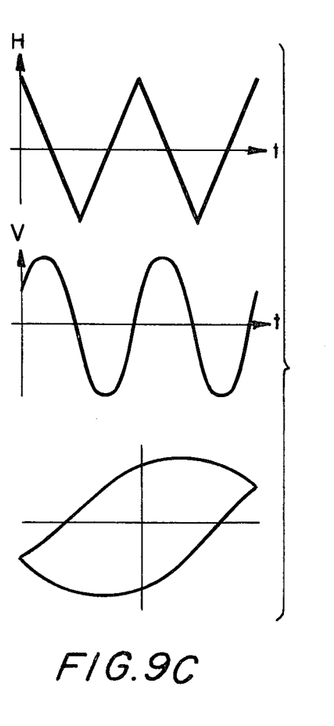

The remaining figures depict the kinds of display which result in the presence of various disturbances when a triangular wave of twice the test tone frequency is applied to the horizontal axis. FIG. 9A depicts the case in which the disturbance signal applied to the vertical plates consists of a second harmonic of the test tone which is in phase with the reference signal applied to the horizontal plates. If the two signals are 180° out of phase with each other, a comparable pattern is seen, except that it is flipped over and occupies the second and fourth quadrants rather than the first and third. If the two signals are slightly out of phase with each other, as shown in FIG. 9C, a similar pattern results but it is not symmetrical. Finally, if the two signals are 90° out of phase as shown in FIG. 9B, the display has the general appearance of an ellipse. In the presence of frequency translation, where the two signals applied to the deflection circuits differ by up to several Hz, the display constantly changes. Nevertheless, a substantially closed loop with no cross-overs is readily discerned, and is an indication of second harmonic distortion.

A third harmonic disturbance also results in an immediately identifiable pattern (not shown in the drawing). When a third harmonic is present, the ratio of the frequencies of the two signals applied to the vertical and horizontal plates is 3:2. The resulting display is a Lissajous pattern which is well known to those skilled in the art, consisting of six lobes in two parallel rows of three each.

Figure 10A:
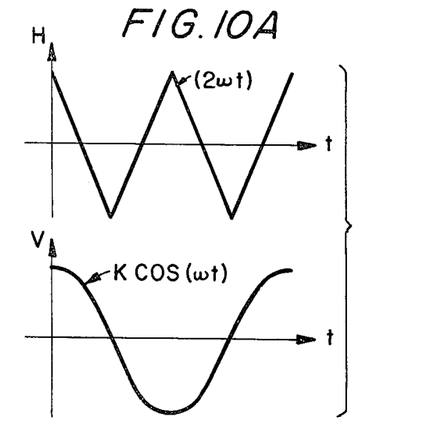
Figure 10B:
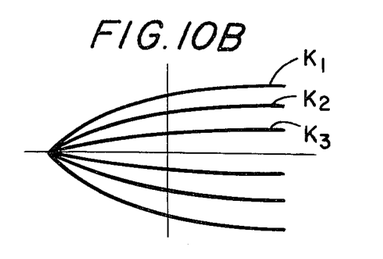
Figure 10C:
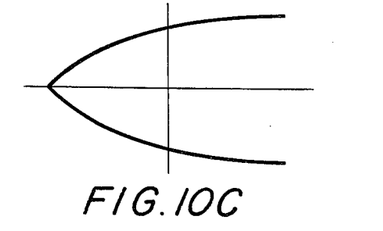

FIG. 10A shows a reference signal which is in phase with the received test tone (but twice its frequency), together with an in-phase (amplitude-related) disturbance signal on the vertical axis. Depending on the value of $K$, the resulting trace is as shown in FIG. 10B. It is cup-shaped and faces toward the right, with the height in the vertical direction depending upon the magnitude of $K$. Three traces, for values of $K = K_1$, $K_2$ and $K_3$ are shown in FIG. 10B. In actual practice, the notched-noise signal applied to the vertical plates does not consist of a cosine signal with a constant amplitude. Instead of a fixed value of $K$, the amplitude of the cosine signal is $m(t)$, a constantly changing signal. Thus what is seen on the display is a constantly widening and narrowing of the rightwardly facing cup. As in the displays of FIGS. 3B and 4B, depending upon the persistence of the screen and the relative frequencies of the test tone and the modulation, the display may exhibit several well-defined traces, contained within each other, or it may be a single more or less uniform density solid cup, or it may be a combination of the two. The important thing is that the general outline of the display is a cup which opens to the right. This is a clear indication of amplitude modulation on the test tone. In the limiting case of an amplitude hit, that is, short-lived amplitude modulation, all that is seen is a single short-lived cup-shaped trace as shown in FIG. 10C.

Figure 11A:
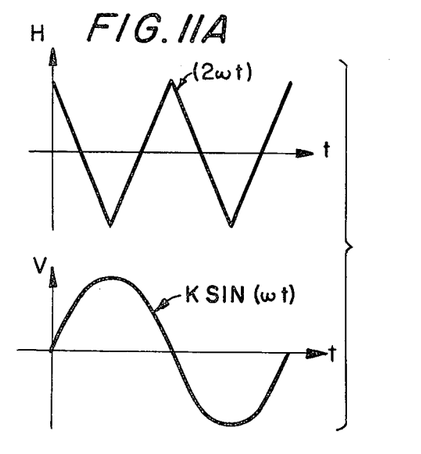
Figure 11B:
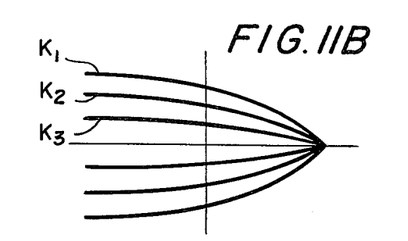
Figure 11C:
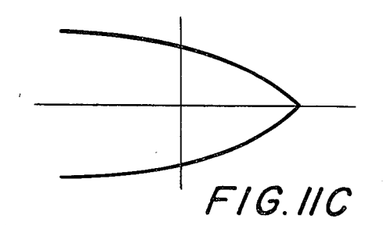

FIG. 11A depicts waveforms similar to those of FIG. 10A except that the vertical notched-noise signal is 90° out of phase with the horizontal reference signal. This is the situation in which phase-related disturbances are present. Depending on the value of $K$, the traces of FIG. 11B result. Once again, since in actual practice $K$ is not constant, but is instead $\theta(t)$, the display constantly changes. But if the display generally represents a cup which opens to the left, it is an indication that a phase-related disturbance is present. In the limiting case of a short-lived phase hit, the short-lived trace of FIG. 11C results.

One of the main benefits of using an harmonic reference signal is that if noise is present along with either an amplitude or phase-related disturbance, then the two types of disturbance can be distinguished. In either case, the display consists of a blurry cup, and whether it faces to the right or left can be readily discerned. Depending on the direction, it is known whether the noise is accompanied by an amplitude-related disturbance or a phase-related disturbance.

Although a sinusoidal waveform could be used on the reference axis, there is an advantage to using a triangular waveform. Each of the waveshapes of FIGS. 10B, 10C, 11B and 11C has a relatively sharp cusp on the horizontal axis. Where a sinusoidal waveform to be applied to the horizontal deflection circuit, the cusp would be replaced by a rounded corner. In the presence of noise, each display degenerates to a blurry trapezoid, but one side of the trapezoid is clearly shorter (in the vertical direction) then the other and thus it is easy to discern whether, together with the noise, there is present an amplitude-relate disturbance or a phase-related disturbance. But without a sharp cusp, the outline of the resulting display is more rectangular in shape and it is more difficult to distinguish between amplitude dominant and phase-dominant disturbances.

Figure 12:
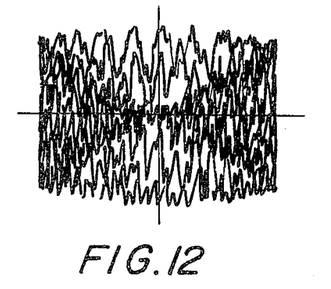
Figure 13:
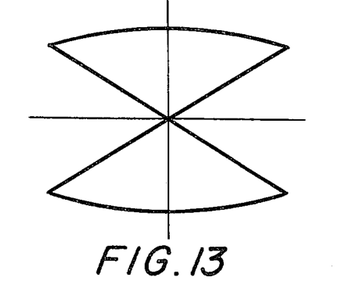

The display of FIG. 12 is what is seen when there are both amplitude-related and phase-related disturbances, of the same frequency and of the same magnitude. In a sense, the display is derived by superimposing the displays of FIGS. 10B and 11B. In the case of simultaneous gain and phase hits, what is seen is the pattern of FIG. 13. Actually the height of the pattern constantly changes. Initially, what is seen is a straight line and then the pattern starts to grow in the vertical direction, both above and below the horizontal axis. After the maximum height is reached, the pattern starts to shrink again. This persists for the duration of the hit, usually about 20–30 L milliseconds. The continuous building up and collapse of the pattern is a clear indication of simultaneous gain and phase hits.

The waveforms of FIGS. 9A-13 are those which result when the signal applied to the horizontal deflection circuit is triangular. The cusp-shaped patterns of FIGS. 10B, 10C, 11B and 11C may be changed to triangular wedges with straight sides by further processing the triangular waveform at the output of summer 36 of FIG. 8. Displays of triangular wedges, facing in opposite directions, are more distinguishable and are especially valuable when it is necessary to distinguish between amplitude-related and phase-related disturbances in the presence of white noise, single frequency interference, or other non-coherent effects.

Figure 14:
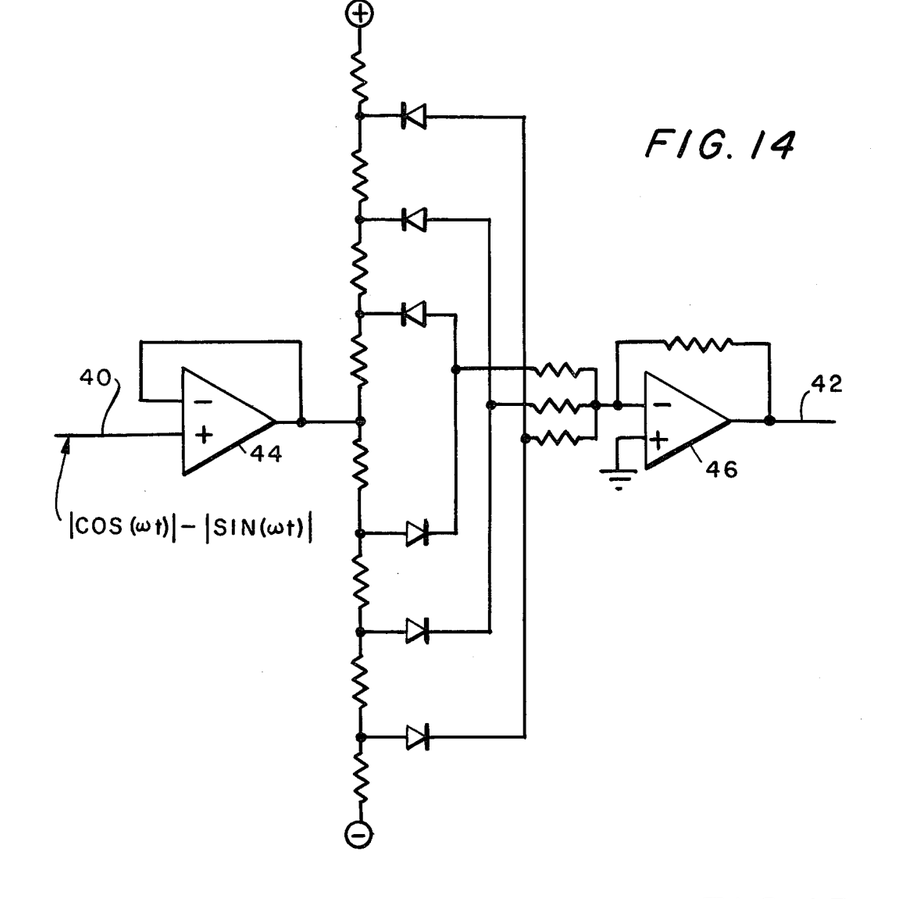
FIG. 14 depicts a circuit for further midifying the signal applied to the horizontal deflection circuit.
Figure 15:
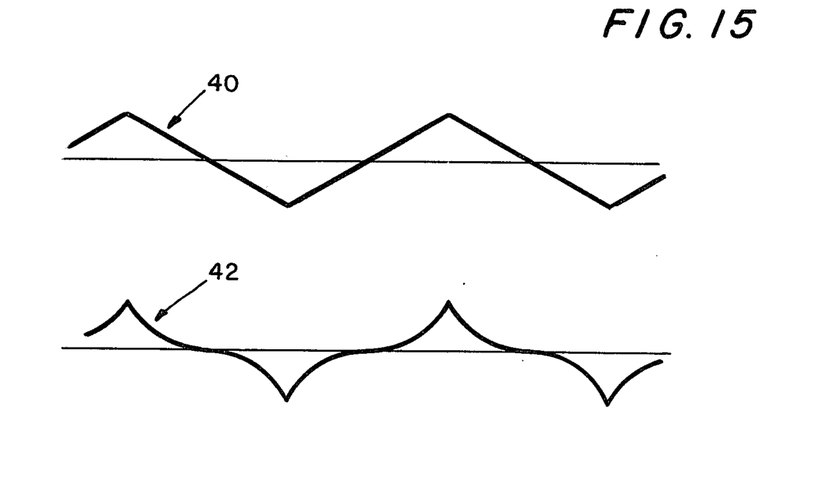
FIG. 15 depicts the input and output waveforms for the circuit of FIG. 14.

The circuit of FIG. 14 illustrates how the horizontal deflection signal of twice the test tone frequency can be modified so as to produce wedge-shaped displys as opposed to cusp-shaped displays. The signal on conductor 40 is that at the output of summer 36 in FIG. 8. This signal is extended through operationl amplifier 46 to conductor 42. It is the signal on conductor 42 that is applied to the horizontal deflection circuit of the oscilloscope. The upper waveform in FIG. 15 represents the triangular signal on conductor 40, and the lower waveform represents the signal on conductor 42 which is applied to the horizontal deflection circuit. By using such a horizontal deflection signal, the cusps of the several waveforms of FIGS. 10B, 10C, 11B and 11C become wedges, facing either to the right or to the left. Even in the presence of white noise, etc., it is relatively simple to examine the display and to determine the direction in which the wedge faces.

Although the invention has been described with reference to particular embodiments, it is to be understood that these embodiments are merely illustrative of the application of the principles of the invention. For example, instead of deriving the notched-noise signal by using the instrumentation of Bradley U.S. Pat. No. 3,814,868, a self-tuned tracking band elimination filter can be used to notch out the test tone from the overall received signal (the reference signal for the oscilloscope being available from the filter). It should also be noted that phase, amplitude or harmonic distortion and other disturbances may be measured as to magnitude, as well as simple being identified, if the received test tone is normalized as in the instrumentation of the Bradley patent. If the received test tone is not normalized but the horizontal deflection signal is proportional to the test tone level, then the relative level of a disturbance may be measured as the ratio of the vertical deflection to the horizontal deflection. Thus it is to be understood that numerous modifications may be made in the illustrative embodiment of the invention and other arrangements may be devised without departing from the spirit and scope of the invention.

What we claim is:

1. A transmission path characteristic display system comprising means for processing a received signal having test tone and disturbance components therein to derive a first signal substantially representative of the instantaneous disturbance component and in which the test tone component is substantially eliminated, display means having first and second orthogonal inputs responsive to the application of signals thereto for generating a display, means for coupling said first signal to said first input, and means for applying to said second input a periodic signal which is synchronous with the received test tone component.

2. A transmission path characteristic display system in accordance with claim 1 wherein said periodic signal is of the same frequency as the received test tone component.

3. A transmission path characteristic display system in accordance with claim 1 wherein said periodic signal has a frequency which is twice that of the received test tone component.

4. A transmission path characteristic display system in accordance with claim 3 wheren said periodic signal is triangular in shape.

5. A transmission path characteristic display system in accordance with claim 4 wherein said periodic signal applying means includes means for deriving a first waveform representative of the absolute magnitude of the received test tone component, means for deriving a second waveform representative of the absolute magnitude of the received test tone component phase-shifted by ninety degrees, and means for subtracting one of said first and second waveforms from the other and for applying the difference signal to said second input.

6. A transmission path characteristic display system in accordance with claim 3 wherein said periodic signal applying means includes means for deriving a first waveform representative of the absolute magnitude of the received test tone component, means for deriving a second waveform representative of the absolute magnitude of the received test tone component phase-shifted by ninety degrees, means for subtracting one of said first and second waveforms from the other, and means for processing the difference signal and applying the processed difference signal to said second input.

7. A transmission path characteristic display system in accordance with claim 3 wherein said periodic signal includes substantially straight-line segments in each cycle thereof.

8. A transmission path characteristic display system in accordance with claim 1 wherein said periodic signal includes substantially straight-line segments in each cycle thereof.

* * * * *